US011398909B2

(12) United States Patent
Madhuram et al.

(10) Patent No.: US 11,398,909 B2
(45) Date of Patent: *Jul. 26, 2022

(54) REUSABLE TEMPLATE FOR ASSET TOKEN

(71) Applicant: Microsoft Technology Licensing, LLC, Redmond, WA (US)

(72) Inventors: Supriya Madhuram, Redmond, WA (US); Nayana Singh Patel, Mercer Island, WA (US); John Marley Gray, Charlotte, NC (US); Gregory Philip Cignavitch, Duvall, WA (US); Brenda Yachu Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

This patent is subject to a terminal disclaimer.

(21) Appl. No.: 16/592,427

(22) Filed: Oct. 3, 2019

(65) Prior Publication Data

US 2020/0351092 A1    Nov. 5, 2020

Related U.S. Application Data

(60) Provisional application No. 62/843,513, filed on May 5, 2019.

(51) Int. Cl.
  *G06F 16/00* (2019.01)
  *H04L 9/32* (2006.01)
  (Continued)

(52) U.S. Cl.
  CPC ............ *H04L 9/3213* (2013.01); *G06F 16/00* (2019.01); *G06Q 20/0658* (2013.01);
  (Continued)

(58) Field of Classification Search
  None
  See application file for complete search history.

(56) References Cited

U.S. PATENT DOCUMENTS

| 7,558,759 B2 | 7/2009 | Valenzuela et al. |
| 9,849,364 B2 | 12/2017 | Tran et al. |

(Continued)

FOREIGN PATENT DOCUMENTS

| CN | 106651303 A | 5/2017 |
| CN | 106778329 A | 5/2017 |
| WO | 2019033074 A1 | 2/2019 |

OTHER PUBLICATIONS

"Agrello Token Design and Functionality", Retrieved from: https://blog.agrello.org/agrello-token-design-and-functionality-6f9935140bc8, Jul. 9, 2017, 5 Pages.

(Continued)

*Primary Examiner* — Robert W Beausoliel, Jr.
*Assistant Examiner* — Pedro J Santos
(74) *Attorney, Agent, or Firm* — Alleman Hall Creasman & Tuttle LLP

(57) ABSTRACT

A computer system comprises a logic system, and, operatively coupled to the logic system, a computer-memory system holding instructions that, when executed by the logic system, cause the computer system to: receive a token-behavior selection corresponding to a real-world asset to be tracked on a virtual ledger; receive a virtual-ledger architecture selection identifying a provider-defined architecture of the virtual ledger; construct a template for registration of a token class on the virtual ledger according to the provider-defined architecture of the virtual ledger, wherein each new token instantiated from the token class exhibits a set of behaviors determined by the token-behavior selection; and provide access to the template to a client computer device.

20 Claims, 11 Drawing Sheets

(51) Int. Cl.

| | |
|---|---|
| *H04L 9/08* | (2006.01) |
| *H04L 9/06* | (2006.01) |
| *G06Q 20/06* | (2012.01) |
| *G06Q 20/38* | (2012.01) |
| *G06Q 20/36* | (2012.01) |
| *G06Q 30/06* | (2012.01) |

(52) U.S. Cl.
CPC ....... *G06Q 20/3672* (2013.01); *G06Q 20/389* (2013.01); *G06Q 30/0621* (2013.01); *H04L 9/0637* (2013.01); *H04L 9/0819* (2013.01); *H04L 9/3228* (2013.01); *G06Q 2220/18* (2013.01)

(56) References Cited

U.S. PATENT DOCUMENTS

| | | | |
|---|---|---|---|
| 10,135,607 B1 * | 11/2018 | Roets | H04L 9/0637 |
| 10,373,158 B1 | 8/2019 | James et al. | |
| 10,657,595 B2 * | 5/2020 | de Jong | G06Q 20/02 |
| 10,839,150 B2 | 11/2020 | Miyamoto et al. | |
| 11,164,165 B1 * | 11/2021 | Andreev | G06Q 20/0655 |
| 2001/0052910 A1 | 12/2001 | Parekh et al. | |
| 2017/0221021 A1 | 8/2017 | Gazetov et al. | |
| 2017/0236104 A1 | 8/2017 | Biton | |
| 2018/0019879 A1 | 1/2018 | Kravitz et al. | |
| 2018/0117446 A1 | 5/2018 | Tran et al. | |
| 2018/0144156 A1 | 5/2018 | Marin | |
| 2018/0264347 A1 | 9/2018 | Tran et al. | |
| 2018/0276626 A1 | 9/2018 | Laiben | |
| 2018/0287893 A1 | 10/2018 | O'brien et al. | |
| 2018/0307859 A1 | 10/2018 | Lafever et al. | |
| 2018/0314809 A1 | 11/2018 | Mintz et al. | |
| 2018/0341861 A1 | 11/2018 | Katz et al. | |
| 2018/0365201 A1 | 12/2018 | Hunn et al. | |
| 2018/0373853 A1 | 12/2018 | Katz et al. | |
| 2019/0036887 A1 | 1/2019 | Miller | |
| 2019/0087844 A1 | 3/2019 | Leekley et al. | |
| 2019/0130507 A1 | 5/2019 | Stollman | |
| 2019/0164152 A1 | 5/2019 | Bucher | |
| 2019/0279215 A1 | 9/2019 | Kuchar et al. | |
| 2019/0303888 A1 | 10/2019 | Hamasni et al. | |
| 2019/0325044 A1 | 10/2019 | Gray | |
| 2019/0349426 A1 | 11/2019 | Smith et al. | |
| 2020/0143300 A1 | 5/2020 | Weldemariam et al. | |
| 2020/0204557 A1 | 6/2020 | Singh et al. | |
| 2020/0219093 A1 | 7/2020 | Malhotra et al. | |
| 2020/0250661 A1 * | 8/2020 | Padmanabhan | G06Q 20/389 |
| 2020/0274712 A1 * | 8/2020 | Gray | H04L 9/3239 |
| 2020/0328891 A1 | 10/2020 | Drouot | |
| 2020/0334752 A1 | 10/2020 | Doney et al. | |
| 2020/0349562 A1 | 11/2020 | Madhuram et al. | |
| 2020/0349625 A1 | 11/2020 | Madhuram et al. | |
| 2020/0351093 A1 | 11/2020 | Madhuram et al. | |

OTHER PUBLICATIONS

"CodeChain Documentation", Retrieved from: https://webcache.googleusercontent.com/search?q=cache:AilpGkViVIIJ: https://buildmedia.readthedocs.org/media/pdf/codechain/latest/codechain.pdf+&cd=1&hl=en&ct=clnk&gl=in, Jun. 5, 2019, 49 Pages.

"DACC White Paper (Decentralized Accessible Content Chain)", In DACC White Paper, Jun. 12, 2018, 53 Pages.

"How To Create Your Own Cryptocurrency Token", Retrieved from: https://hackernoon.com/how-to-create-your-own-cryptocurrency-token-b4e3eeac34aa, Nov. 5, 2018, 10 Pages.

"Managing Crypto Tokens", Retrieved from: https://doc.primekey.com/ejbca/ejbca-operations/ejbca-operations-guide/ca-operations-guide/managing-crypto-tokens, Retrieved Date: Jun. 3, 2019, 3 Pages.

"Mobilechain—A Blockchain Platform for Mobile Apps", Retrieved from: https://www.mobilechain.network/mobilechain.pdf, Retrieved Date: Jun. 5, 2019, 61 Pages.

"What are Ethereum Smart Contracts", Retrieved from: https://www.coinbureau.com/education/ethereum-smart-contracts/, Oct. 1, 2017, 10 Pages.

"What is Cosmos Blockchain? The Most Comprehensive Guide Ever", Retrieved from: https://blockgeeks.com/guides/cosmos-blockchain-2/. Retrieved Date: May 14, 2019, 21 Pages.

Amravatkar, Hrishikesh, "Tendermint-Blockchain Applications in Any Programming Language", Retrieved from: http://dappsguru.com/2017/11/04/tendermint-blockchain-applications-in-any-programming-language/, Nov. 4, 2017, 2 Pages.

Biggs, John, "How to Run a Token Sale", Retrieved from: https://techcrunch.com/2017/09/22/how-to-run-a-token-sale/?_ga=2.100157278.1189621451.1559623352-1607838053.1559301201, Sep. 22, 2017, 11 Pages.

Howell, et al., "Initial Coin Offerings: Financing Growth with Cryptocurrency Token Sales", In Proceedings of National Bureau of Economic Research, Jun. 29, 2018, 64 Pages.

Howell, et al., "Initial Coin Offerings: Financing Growth with Cryptocurrency Token Sales", Retrieved from: https://www.aeaweb.org/conference/2019/preliminary/powerpoint/HaTab6kr, Jun. 5, 2019, 30 Pages.

Hsieh, Johnny, "Deploy and Interact with Solidity Smart Contract on TOMOChain!!", Retrieved from: https://medium.com/@johnnyhsieh/deploy-and-interact-with-solidity-smart-contract-on-tomochain-f6fcbd2c6498, Oct. 18, 2018, 6 Pages.

Kakutani, et al., "Secret Contract Platform for Privacy 2.0", Retrieved from: https://web.archive.org/web/20190413143828/https:/quras.io/en/, Apr. 13, 2019, 8 Pages.

Neto, Moritz, "How to Issue Your Qwn Token on Ethereum in Less Than 20 Minutes", Retrieved from: https://medium.com/bitfwd/how-to-issue-your-own-token-on-ethereum-in-less-than-20-minutes-ac1f8f022793, Dec. 26, 2017, 12 Pages.

Walters, Steve, "Metaverse ETP: Everything You Need to Know", Retrieved from: https://www.coinbureau.com/review/metaverse-etp/, Sep. 14, 2018, 13 Pages.

Walters, Steve, "Agrello (DLT) Review: The Project Building Legal Smart Contracts", Retrieved from: https://www.coinbureau.com/review/agrello-dlt/, Sep. 27, 2018, 11 Pages.

Allison, Ian, "Microsoft, Ethereum Group Launch Token-Building Kit for Enterprises—CoinDesk", Retrieved From: https://www.coindesk.com/microsoft-ethereum-group-launch-token-building-kit-for-enterprises, Apr. 17, 2019, 10 Pages.

Ballandies, et al., "Decrypting Distributed Ledger Design—Taxonomy, Classification and Blockchain Community Evaluation", In Repository of arXiv:1811.03419v1, Oct. 30, 2018, 16 Pages.

Guida, et al., "Supporting Reuse of Smart Contracts through Service Orientation and Assisted Development", In Proceedings of the IEEE International Conference on Decentralized Applications and Infrastructures, Apr. 4, 2019, pp. 59-68.

"International Search Report and Written Opinion Issued in PCT Application No. PCT/US20/026769", dated Jul. 24, 2020, 12 Pages.

"International Search Report and Written Opinion Issued in PCT Application No. PCT/US20/026770", dated Jul. 22, 2020, 13 Pages.

"International Search Report and Written Opinion Issued in PCT Application No. PCT/US20/026772", dated Jul. 24, 2020, 13 Pages.

"International Search Report and Written Opinion Issued in PCT Application No. PCT/US20/026773", dated Jul. 24, 2020, 14 Pages.

"Non-Final Office Action Issued in U.S. Appl. No. 16/592,551", dated Apr. 1, 2021, 21 Pages.

Allison, Ian, "Barclays' Smart Contract Templates stars in first ever public demo of R3's Corda platform", Retrieved from http://www.ibtimes.co.uk/barclayssmart-contract-templates-heralds-first-ever-public-demo-r3s-corda-platform-1555329, Jul. 11, 2016, 4 Pages.

Braine, Lee, "Barclays' Smart Contract Templates", Retrieved from: https://vimeo.com/168844103, Jan. 1, 2016, 2 Pages.

Clack, et al., "Smart Contract Templates: Foundations. Design Landscape and Research Directions", In Repository of arXiv:1608.00771v3, Mar. 15, 2017, 15 Pages.

Valenta, Martin, "Comparison of Ethereum, Hyperledger Fabric and Corda", Retrieved from: http://www.smallake.kr/wp-content/uploads/2017/07/2017_Comparison-of-Ethereum-Hyperledger-Corda.pdf, Jun. 2017, 8 Pages.

(56) References Cited

OTHER PUBLICATIONS

"Non Final Office Action Issued in U.S. Appl. No. 16/592,513", dated Aug. 31, 2021, 23 Pages.
"Final Office Action Issued in U.S. Appl. No. 16/592,551", dated Sep. 17, 2021, 21 Pages.
"Final Office Action Issued in U.S. Appl. No. 16/592,513", dated Dec. 22, 2021, 24 Pages.
"Non Final Office Action Issued In U.S. Appl. No. 16/592,577", dated Dec. 10, 2021, 20 Pages.
"Non Final Office Action Issued in U.S. Appl. No. 16/592,551", dated Apr. 1, 2022, 9 Pages.
Dolderer, Felix, "Identification of Dimensions for the Description of Blockchain-based Token Systems", In Bachelor Thesis submitted to Department of Economy in Business Information Systems Program, May 7, 2018, 88 Pages.
Karl, et al., "ICOS in Belgium: Initial Considerations on Financial, Accounting and Tax Law Implications", In Proceedings of 6th International Conference of PhD Students and Young Researchers-Digitalization in Law, May 3, 2018, pp. 168-179.

* cited by examiner

SYSTEM SOFTWARE 206

```
class reward {
  function create (owner, amount) {
  }
  function redeem (owner, amount) {
  }
  function transfer (from_owner, to_owner, amount) {
  }
```

← TOKEN CLASS 204

⋮

← TOKEN 202 reward.create(owner = 1234, amount = 5000)

reward.create(owner = 3456, amount = 6000)

reward.transfer(from_owner = 3456, to_owner = 1234, amount = 2000)

reward.redeem(owner = 1234, amount = 7000)

⋮

VIRTUAL LEDGER 118

*FIG. 2*

TOKEN-TEMPLATE MARKETPLACE

LOYALTY TOKEN CATEGORY

ALPHA LOYALTY TOKEN

☑ SHOW DETAIL

☐ ADD TO CART

Alpha loyalty token exhibits fungible and non-transferable behaviors and allows customization of the token class to reflect the rewards program name and ...

420

BETA LOYALTY TOKEN

☐ SHOW DETAIL

☐ ADD TO CART

REUSABLE TEMPLATE FOR ASSET TOKEN

CROSS REFERENCE TO RELATED APPLICATIONS

This application claims priority to U.S. Provisional Patent Application Ser. No. 62/843,513, filed May 5, 2019, the entirety of which is hereby incorporated herein by reference for all purposes.

BACKGROUND

Virtual ledgers based on blockchain architecture can be used to track the creation, exchange, and redemption of certain real-world assets, such as currency. This approach enables robust auditing of asset transactions due to the practical immutability of data stored on a blockchain. Currency is only one of various assets that may be desirable to track on a virtual ledger. Other types of assets may differ from currency with respect to one or more behaviors that govern asset creation, exchange, and/or redemption. Moreover, different blockchain architectures may differ with respect to policies and protocols, and further with respect to the tools used to program asset behaviors.

SUMMARY

One aspect of this disclosure is directed to a computer-implemented method comprising receiving both a token-behavior selection corresponding to a real-world asset to be tracked on a blockchain ledger and a blockchain-architecture selection identifying a provider-defined architecture of the blockchain ledger. The method further comprises constructing a template for registration of a token class on the blockchain ledger according to the provider-defined architecture, wherein each new token instantiated from the token class exhibits a set of behaviors determined by the token-behavior selection, and wherein the template is reusable for repeated addition of the token class to one or more blockchain ledgers. The method further comprises adding the token class to the blockchain ledger.

Another aspect of this disclosure is directed to a computer system comprising a logic system, and, operatively coupled to the logic system, a computer-memory system holding instructions that, when executed by the logic system, cause the computer system to: receive a token-behavior selection corresponding to a real-world asset to be tracked on a virtual ledger; receive a virtual-ledger architecture selection identifying a provider-defined architecture of the virtual ledger; construct a template for registration of a token class on the virtual ledger according to the provider-defined architecture, wherein each new token instantiated from the token class exhibits a set of behaviors determined by the token-behavior selection; and provide access to the template to a client computer device.

Another aspect of this disclosure is directed to a computer-implemented method comprising receiving both a token-behavior selection corresponding to a real-world asset to be tracked on a virtual ledger and a virtual-ledger architecture selection identifying a provider-defined architecture of the virtual ledger. The method further comprises constructing a template for registration of a token class on the virtual ledger according to the provider-defined architecture, wherein each new token instantiated from the token class exhibits a set of behaviors determined by the token-behavior selection. The method further comprises adding the token class to the virtual ledger, receiving a token-management request relating to at least one token instantiated from the token class, reformulating the token-management request according to the provider-defined architecture, and submitting the reformulated token-management request to a network hosting the virtual ledger.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 2 shows additional aspects of an example virtual ledger.

FIG. 4B shows aspects of an example marketplace user interface.

DETAILED DESCRIPTION

Figure 1:
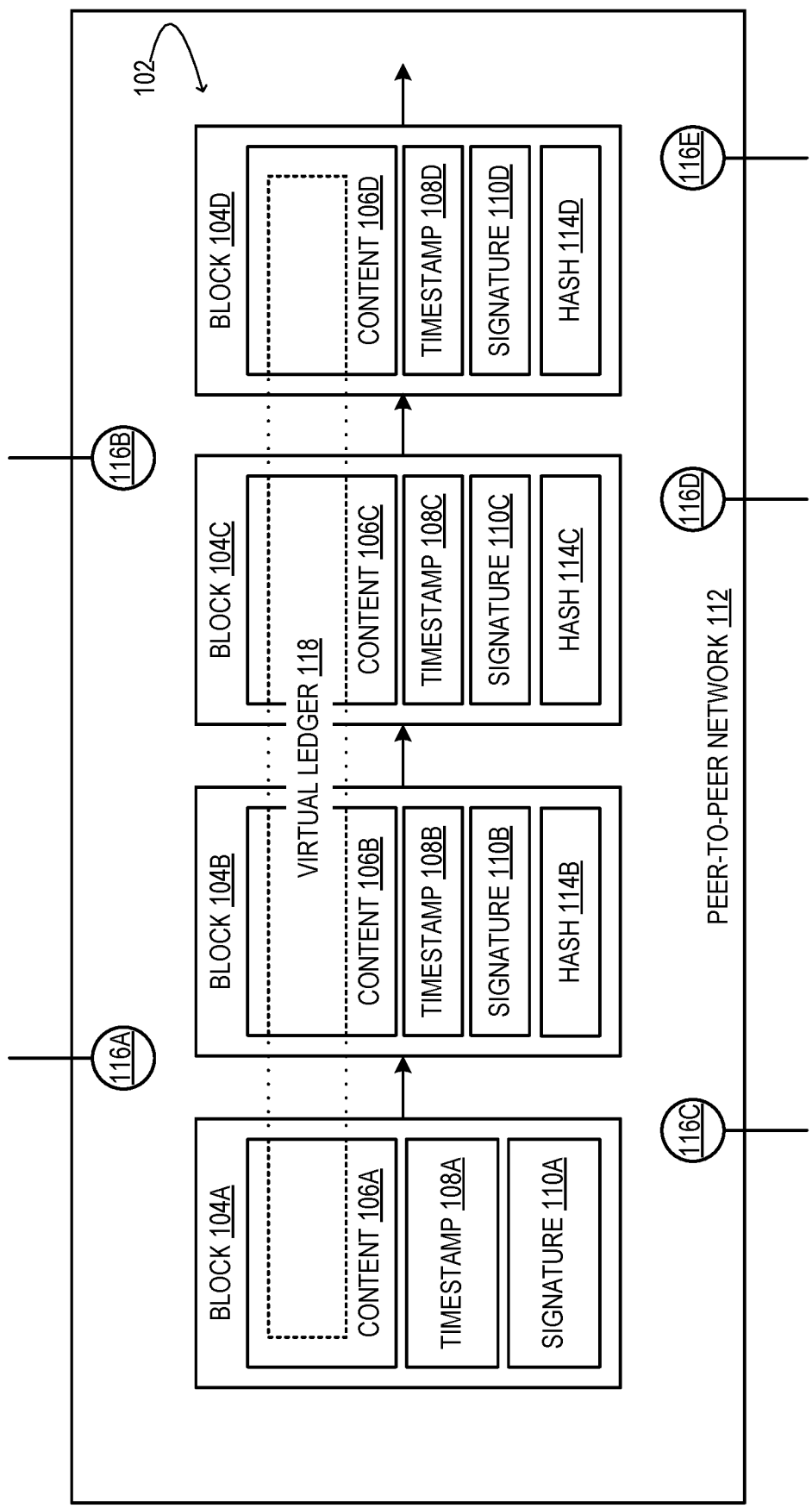
FIG. 1 shows aspects of an example virtual ledger in the form of a blockchain ledger residing on a peer-to-peer network.

This disclosure is directed to a computer system and related network service to enable a real-world asset to be represented and tracked as a token on a blockchain or other form of virtual ledger. A token is a strongly typed, digital data structure that derives from a token class appropriate for the type of asset to be tracked. In this approach, the token class from which each token is instantiated is formulated automatically based on a reusable token-class template constructed according to the needs of the client intending to deploy the virtual ledger.

As noted above, various assets that can be tracked on a virtual (e.g., blockchain) ledger may differ with respect to the behaviors that govern asset creation, exchange, and/or redemption. In general, a virtual ledger where each unit of an asset is represented by some form of digital token is programmed to endow that token with a set of behaviors appropriate for the asset it represents. By way of example, 'fungible' behavior enables an asset to be exchanged with other assets of the same class. Every unit of a given denomination of currency (e.g., a dollar) is fungible, because it has the same value as every other unit of the same denomination. A property title, by contrast, is 'non-fungible' because its value depends on the size, location, and other aspects of the specified property. For each asset represented as a token, the appropriate fungible or non-fungible behavior is programmed into that token's class in the virtual ledger that tracks the asset.

Naturally, a real-world asset may be characterized by numerous other behaviors besides fungibility. An asset may be 'transferable' or 'non-transferable', 'expirable' or 'non- 'expirable', 'burnable', and so on. In general, all of the behaviors of an asset tracked on a virtual ledger should be programmed into that asset's token class. Adding to this complexity is a lack of standardization among the policies, protocols and programming languages used in the various blockchain architectures available today. As a result, a client intending to deploy a virtual ledger to track an asset of interest may have to program the behaviors of each token class separately, for every blockchain architecture on which a virtual ledger is to be deployed.

These issues, among others, are addressed by a computer system and/or network service that enables the client to determine the behaviors of the asset of interest and the provider-defined architecture of the virtual ledger. The computer system automatically constructs a reusable template for addition of a new token class to the virtual ledger. The client may access the template in order to deploy the virtual ledger, using, in some cases, a deployment package, application-programming interface (API) and/or software-development kit (SDK) automatically provided via the network service and customized according to the indicated asset behaviors and virtual-ledger architecture.

In this disclosure, an 'asset' is a thing of value that can be owned by or otherwise associated with a person or group of people; the term 'owner' refers to the party to which an asset is associated, whereas 'client' refers to any party that deploys and/or maintains a virtual ledger for the purpose of tracking an asset. A ent may be a person, a company, an organization, or a government, as examples.

An asset can be created, redeemed, and, in some cases, exchanged between owners. Generally speaking, a ledger may be used to track these and other asset transactions. In the implementations disclosed herein, asset transactions are tracked on a virtual ledger i.e., a strongly typed, digital data structure stored in a computer-memory system. By extending appropriate read and write access to the data structure, the various transactions of any asset represented on the virtual ledger may be recorded and verified.

Some virtual ledgers may be hosted on a centralized computer-memory system maintained by an authority. Centralized hosting exposes the data on a virtual ledger to risk of loss or corruption due to human error, malicious tampering, computer failure, and other causes. In view of these issues, a virtual ledger may be hosted on a decentralized computer-memory system of a network of substantially independent computer devices. A virtual ledger hosted in this manner may take the form of a blockchain residing on a peer-to-peer network, as shown in FIG. 1.

Blockchain 102 of FIG. 1 includes a plurality of blocks 104 of digital data. Each block includes content data 106, a timestamp 108, and a cryptographic digital signature 110, providing source-authentication of the content data. The timestamp may be supplied by a distributed-computing service executing on peer-to-peer network 112. In some examples, the timestamp may be encrypted. Each block also includes, with the exception of genesis block 104A, a cryptographic hash 114 of the content data of a previously written, antecedent block. The hash links each block to its antecedent, defining the blockchain structure.

FIG. 1 shows a plurality of nodes 116 of peer-to-peer network 112. Embodied as a computer device with processing functionality, any node is able to verify the provenance of a given block 104 by determining whether it contains a valid hash of the content data from its antecedent block. The verification can be iterated all the way back to the genesis block 104A, if desired. This feature makes the content data of the blockchain effectively immutable, in the sense that it cannot be altered without the approval of a consensus of nodes 116. As described hereinafter, such nodes may include computer devices operated by the client that maintains the virtual ledger and by the various owners of the asset being tracked on the virtual ledger. On a 'public' blockchain, blocks can be accessed and/or added by any computer device capable of joining peer-to-peer network 112. On a 'private' or 'permissioned' blockchain, the permissions extended to each node are determined by a central authority, such as the client.

Continuing in FIG. 1, virtual ledger 118 may be distributed within the content data 106 of any, some, or all of the blocks 104 of blockchain 102. In this manner, the virtual ledger is shared among the various nodes 116 of peer-to-peer network 112. FIG. 2 provides another representation of virtual ledger 118 implemented to track the exchange of an asset. Each asset of a particular kind is represented on the virtual ledger by a token 202 of a corresponding token class 204. Each token is an instance of its token class and is instantiated from that token class by system software 206 deployed on the peer-to-peer network on which the virtual ledger resides.

Token class 204 defines the properties and behaviors of each token 202 instantiated from that class. A 'property' may refer to data associated with the token. For example, the 'owner' property of a token may be a parameter value that represents the current owner of the asset that the token represents, By contrast, a 'behavior' may refer to a functional aspect analogous to the asset behaviors referenced above (e.g., fungible, transferable, and so on) and embodied as executable code or script provided within the token class. The token class itself is registered on virtual ledger 118 before any token of that class is instantiated. As described further below, registration of the token class may be achieved via a deployment package that executes on a client computer device with access to peer-to-peer network 112.

Figure 3:
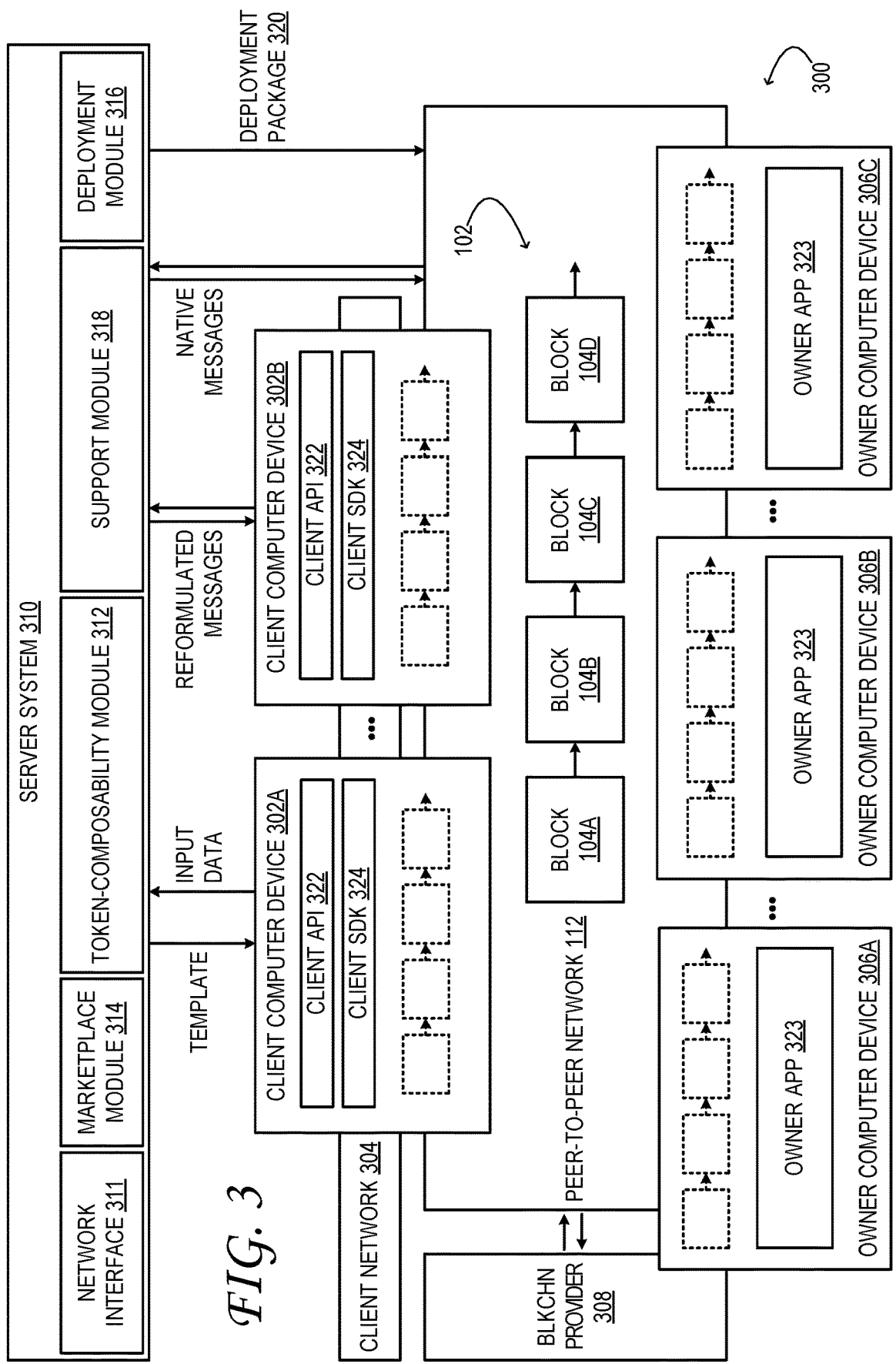
FIG. 3 shows aspects of an example computer system configured to enable a real-world asset to be represented and tracked as a token on a virtual ledger.

FIG. 3 shows aspects of an example computer system 300 configured to enable a real-world asset to be represented and tracked as a digital token on a virtual ledger. The computer system includes one or more client computer devices 302 operated by a client with interest in deploying a virtual ledger for tracking an asset. The client computer devices may be linked by a client network 304 such as a local-area network (LAN) or a virtual private network (VPN), The computer system also includes one or more owner computer devices 306. In some implementations, any, some, or all of the client and owner computer devices may also be linked via a wide-area network (WAN), such as the Internet. In some implementations, the client and/or owner computer devices may be instances of computing system 1000 of FIG. 10, which is described hereinafter.

Continuing in FIG. 3, client computer devices 302 and owner computer devices 306 of computer system 300 are further linked by an additional network configured to support a virtual ledger. In the illustrated example, this additional network takes the form of peer-to-peer network 112, which is implemented on the client and owner computer devices (nodes 116 of the peer-to-peer network) according to the blockchain architecture defined by blockchain provider 308.

FIG. 3 shows blockchain 102 residing on the peer-to-peer network. Peer-to-peer network 112 comprises the combined computer-memory systems of its various nodes 116—viz., the linked client and owner computer devices; blockchain data including virtual ledger 118 may be stored redundantly on any, some, or all of the nodes. Accordingly, the nodes of the peer-to-peer network, on which the blockchain resides, may also be referred to as nodes of the blockchain.

As noted above, various blockchain providers may support an architecture for implementing a client's virtual ledger on a peer-to-peer network. However, the client still may face challenges in deployment of the virtual ledger. In particular, the behavior of each token on the virtual ledger should mirror the real-world behavior of the asset that the token represents. As every behavior that characterizes a token derives from its token class, such behavior should be programmed into that token class. However, token-behavior programming is not standard across the various provider-defined blockchain architectures, because different architectures use different programming languages. Accordingly, the procedure for registering a given token class may differ for the various blockchain architectures, thereby requiring a different deployment package for each blockchain architecture and token class. Furthermore, the different blockchain architectures may operate on peer-to-peer networks that enforce different policies and use different protocols. Such differences may necessitate customized token-management software and owner software—which, in turn, may require a customized software-development kit (SDK) to support development of appropriate owner software by the client.

To address the above issues and to secure still other advantages, computer system 300 also includes a server system 310 comprising a network interface 311 and a plurality of service modules. The network interface comprises network hardware that communicatively couples each of the service modules to one or more of the client computer devices 302, via a WAN. In the example shown in FIG. 3, the service modules of server system 310 include a token-composability module 312, a marketplace module 314, a deployment module 316, and a support module 318.

Token-composability module 312 is configured to receive input data from a client computer device 302 and to construct a token-class template based on the input data. The input data includes a token-behavior selection corresponding to a real-world asset to be tracked on a virtual ledger. The token-behavior selection determines the set of behaviors required of each new token of the token class to be registered on the virtual ledger. By supporting registration and instantiation of the token class, in addition to various transactions of the instantiated tokens, the virtual ledger is adapted to track real-world assets represented by the instantiated tokens. The input data provided to token-composability module 312 may also include, inter alia, a virtual-ledger architecture selection that identifies the provider-defined architecture of the virtual ledger. Using this input data, the token-composability module constructs a token-class template for registration of the token class on the virtual ledger according to the provider-defined architecture of the virtual ledger. In this manner, each new token of the token class is guaranteed to correctly exhibit the indicated set of behaviors upon deployment on the virtual ledger. The token-composability module is further configured to provide access to the template to one or more client computer devices 302.

Figure 4A:
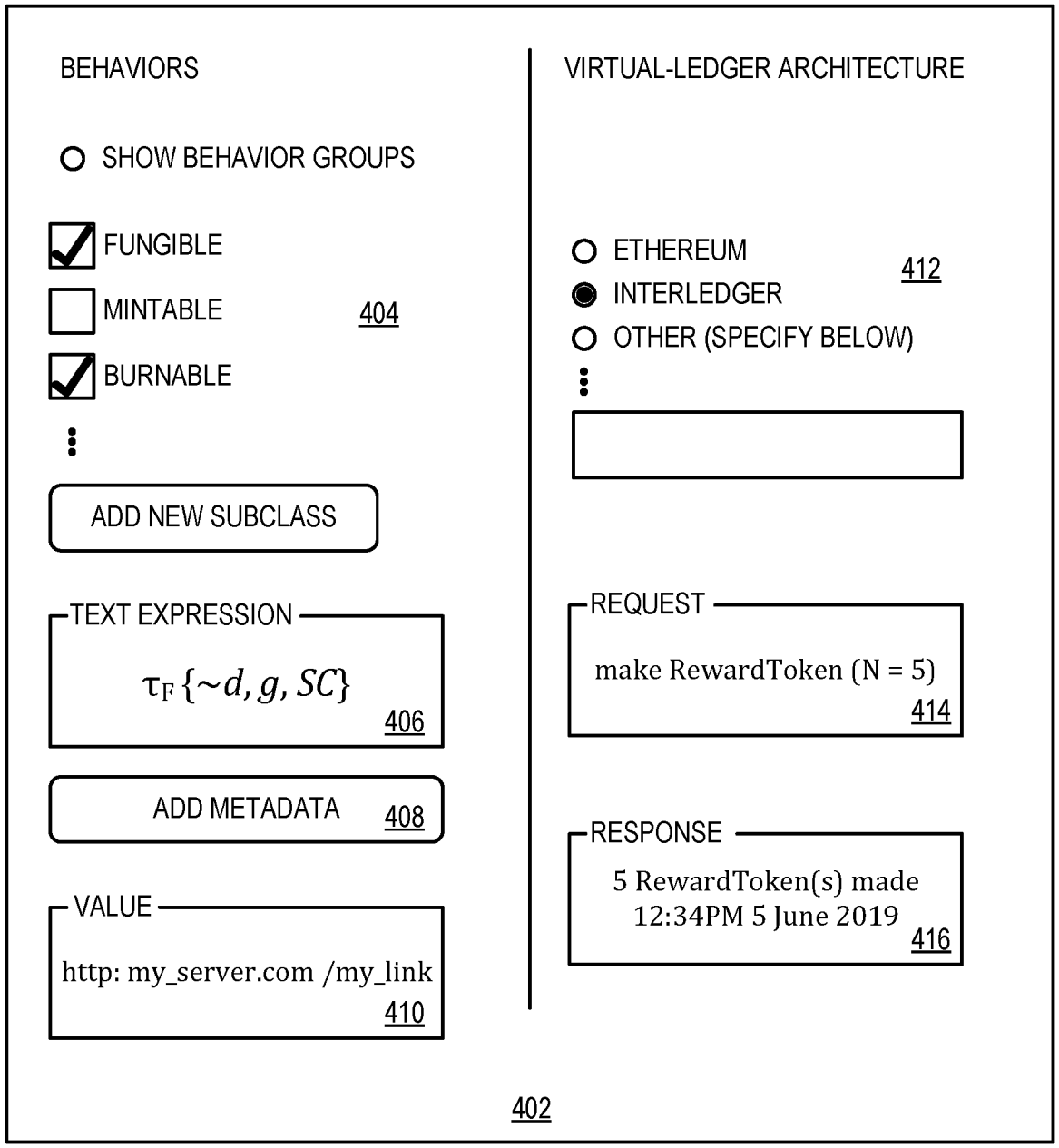
FIG. 4A shows aspects of an example client user interface.

FIG. 4A shows aspects of an example client user interface (UI) 402 configured for presentation on a client computer device 302. Shown in simplified form in FIG. 4A, the client UI includes a token-behavior input area 404, a text-expression dialog 406, a metadata-addition button 408, and a metadata-value dialog 410. The client UI also includes a virtual-ledger architecture identification area 412, a request dialog 414, and a response dialog 416. The illustrated features of client UI 402 will be referenced in the context of the methods illustrated in FIGS. 5 through 8 and described hereinafter.

Returning now to FIG. 3, marketplace module 314 is configured to provide a network service whereby a template constructed by token-composability module 312, based on a client's indicated combination of token behaviors and virtual-ledger architecture, may be offered to other potential clients for sale or license.

FIG. 4B shows aspects of an example marketplace UI 418 configured for presentation to a client on a client computer device 302. Shown in simplified form in FIG. 4B, the marketplace UI includes a template-description window 420. The illustrated features of client UI 402 will be referenced in the context of the method illustrated in FIG. 8 and described hereinafter.

Returning again to FIG. 3, deployment module 316 is configured to add a new token class to a virtual ledger based on a template constructed by token-composability module 312. To this end, the deployment module creates a customized deployment package 320 that executes on the virtual ledger. In some examples, the deployment module may be further configured to construct and provide client access to an application-programming interface (API) 322 configured to expose one or more behaviors and/or control functions of each new token of the token class deployed on the virtual ledger. The API allows any token representing an asset to be operated on (e.g., transferred, divided, expired, and so on) in an architecture-agnostic manner.

Via API 322, a client may create new token instances, view token balances, transfer tokens, and/or call control functions for the tokens on a virtual ledger. In short the client may use the API to develop complex contracts without having familiarity with the specific policies, protocols, and/or programming languages of any particular blockchain architecture. Token properties may be queried and stored in a registry via the API.

API 322 may take the form of a representational state-transfer (REST) API in some examples. Using this type of API, the client need not be concerned with any of the various 'smart-contract' details associated with token management. Instead, deployment module 316 may build a REST-addressable resource for each token class that the client creates, which exposes all of the control functions of that class. The REST API definition may also define a request payload, which specifies function arguments in an intuitive and generic way. This feature may enables a client to develop owner applications that interact with tokens, even without knowing how to program in the language of the provider-defined blockchain architecture. In some examples, a token template deployed to any type of blockchain may be interacted with using the same API, making it possible to develop owner applications (vide infra) that are inter-operable on plural blockchains.

As noted above, a client may instantiate the one or more token classes registered on a blockchain or other type of virtual ledger, associating the token instances to one or more owners to represent assets held by the owners. In some examples, a client may enable an asset owner to directly execute transactions involving his or her owned assets—e.g., to exchange or redeem an asset. To this end, the client may provide owner software such as a stand-alone owner application 323—to be executed or otherwise accessed from an owner computer device 306. Alternatively, or in addition, the client may provide an owner web app to be accessed by the owner over the Internet. To facilitate the client's development of such software, deployment module 316 may be further configured to construct and provide client access to a software-development kit (SDK) 324 configured to facilitate access to one or more behaviors and/or control functions of each new token of the token class on the virtual ledger. The SDK may be customized for the appropriate token behaviors and further customized, based on provider-defined policies and protocols, for the virtual-ledger architecture.

Support module 318 is configured to facilitate client access to a virtual ledger after deployment. To this end, the support module may serve as a conduit for various token-management requests and responses exchanged between a client computer device 302 and peer-to-peer network 112. Via the support module, interaction with token properties and behaviors may surface in the form of relatively simple message definitions agnostic to the specificalities of the virtual-ledger architecture as defined by blockchain provider 308. Such messages may represent token schema and state and may include one or more request/response message pairs, for example.

Each of the different virtual-ledger architectures may have different protocols and/or requirements with respect to token transactions. For instance, the procedures for submitting and signing transactions may differ. Moreover, the requirements governing uniqueness, retry logic, and finality of transactions may also differ. Accordingly, support module 318 supports a submission pipeline that is architecture-agnostic. More particularly, the support module may be configured to receive various token-management requests relating to one or more new tokens of a token class registered on the virtual ledger. As virtual ledgers of different architectures may differ with respect to messaging protocols, the support module may be configured to reformulate each token-management request based on the provider-defined architecture of the virtual ledger and the policies and protocols therein. The support module may be configured to submit each reformulated token-management request to the peer-to-peer network 112 hosting the virtual ledger. The support module may be likewise configured to receive various messages (e.g., response messages) from the host network and to reformulate the messages in an architecture-agnostic format, for consumption by client computer devices 302.

Figure 5:
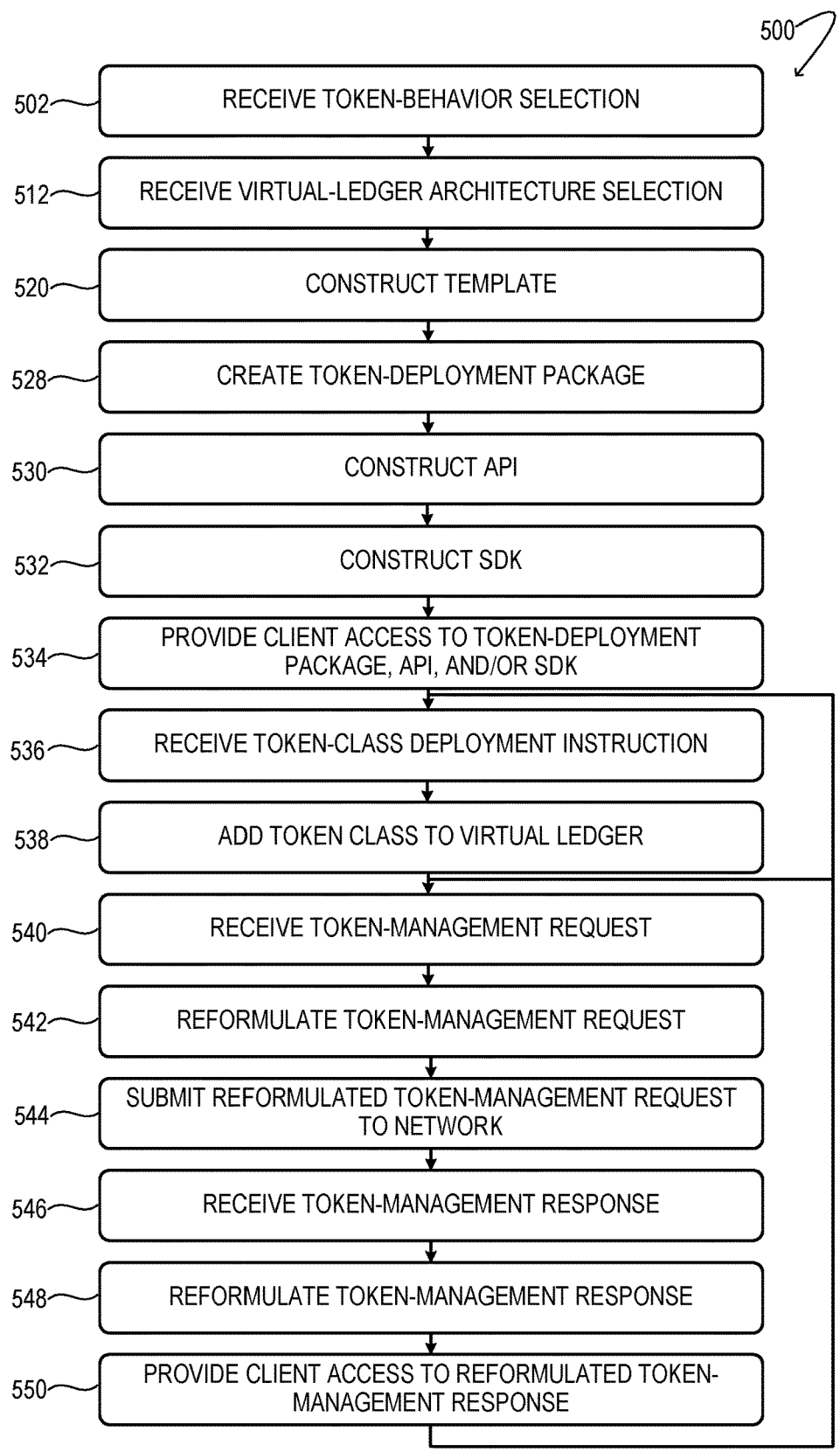
FIGS. 5 through 8 show aspects of example computer-implemented methods to enable a real-world asset to be represented and tracked as a digital token on a virtual ledger.

FIG. 5 illustrates aspects of an example computer-implemented method 500 to enable a real-world asset to be represented and tracked as a digital token on a virtual ledger. In each of the methods herein, the virtual ledger on which an asset is tracked may include a blockchain ledger; other types of virtual ledgers may also be used, however, alternatively or in addition. In some examples, method 500 may be implemented on a server system, such as server system 310 of FIG. 3. It will be understood, however, that not all implementations of the method require the detailed server architecture of server system 310 and may be implemented on other types of computer systems.

At 502 of method 500, the server system receives a token-behavior selection corresponding to a real-world asset to be tracked on a virtual ledger. The token-behavior selection determines the set of behaviors required of each new token of the token class to be registered on the virtual ledger. By supporting registration and instantiation of the token class, in addition to various transactions of the instantiated tokens, the virtual ledger is adapted to track real-world assets represented by the instantiated tokens. Reflecting particular client objectives, the token-behavior selection may be composed by a client and received from a networked client computer device.

Supported behaviors of a token may be defined as capabilities or restrictions. Behaviors may be common across all base token types, or may only apply to a subset of base token types. Behaviors may have supporting properties that become a part of the token schema and definition. Behaviors may be internal or external, depending on what the behavior enables or restricts: an internal behavior may enable or restrict properties of the token itself, whereas an external behavior may enable or restrict the invocation of the behavior by an external actor.

Each set of behaviors determined by a token-behavior selection may comprise of one or more component behaviors. Some example component behaviors are defined below.

A 'fungible' token is interchangeable with every other token of the same token class. Tokens representing a particular currency denomination are fungible, for example. By contrast, a 'non-fungible' token is generally not interchangeable with other tokens of the same class. Such behavior is appropriate for a token representing a property title, for example. A 'burnable' token can be removed from a virtual ledger; a 'non-burnable' token cannot be removed. A 'delegable' token may delegate one or more behaviors of that token to a party that differs from the token owner. For example, a vote may be represented as a delegable token if the owner of the underlying asset (i.e., the vote) delegates another owner to vote on his or her behalf. An 'encumberable' token may prevent certain native behaviors (e.g., burnable or transferable) from being invoked. An 'expirable' token has time-bound validity on the virtual ledger on which it is deployed. A 'lockable' token has the ability to freeze its current state. A token is 'mintable' if additional tokens of its token class can be created. A 'renewable' token may be renew after expiration. A 'singleton' token is limited to a supply of one on any virtual ledger. A 'subdividable' token can be subdivided into plural tokens representing portions of an underlying asset, whereas a 'whole' token cannot be subdivided. A 'transferable' token can be transferred from its current owner to another owner, whereas a 'non-transferable' token cannot be transferred. A token having 'TransferFrom' behavior can specify the source owner in a transfer. A token having 'RoleSupport' behavior can define roles within the token template class for additional behaviors.

Other component behaviors of a token may be derived from two or more of the elementary forms listed above. 'Stretch Goal Hybrid' tokens have components of both fungible tokens and non-fungible tokens. This behavior may be realized via a base token that owns the class of another token. One such example is 'non-fungible base with fungible segments', e.g., a concert ticket, where the non-fungible parent token represents the date and time of the concert, and where one or more fungible token segments represent tickets in one or more seating sections. Such tickets are exchangeable within their section, but not across sections. Another example is 'fungible base with non-fungible segments', e.g., a mortgage backed security, where the fungible base can be split across many interchangeable owners, and where the non-fungible segments correspond to the individual mortgages that make up the security.

In some examples, the set of behaviors determined by a token-behavior selection may be one of a plurality of predefined sets of behaviors. In other words, certain sets of behaviors may be preselected for common applicability to plural asset types. In one example, the set of behaviors may include the combination of token-fungible behavior and inventory-control behavior. With the optional addition of RoleControl behavior, the client acquires the ability to determine which owners may execute selected token transactions—e.g., to mint additional tokens of the same token class. In another example, the set of behaviors may include the combination of token-fungible behavior and token-expiration behavior. This option gives sets an expiration on the token's circulation time, after which the token would no longer be tradable. Additional predefined sets of behaviors are also envisaged. These include 'SupplyControl' behavior, which groups together the above mintable, burnable, and RoleSupport behaviors. 'Financeable' behavior groups together the above encumberable, whole, lockable, and role support behaviors. 'Custodial' behavior groups together the above delegable and RoleSupport behaviors.

Some predefined sets of behaviors may be suited to relatively common client interests. A loyalty token, for instance, may comprise the following behaviors: fungible (whole, transferable, expirable, burnable, mintable). In another example, a document token that supports a financial security may comprise: non-fungible (whole, transferable, singleton, encumberable, burnable). Another relatively common set corresponds to the behaviors of a hybrid token comprising a non-fungible base that can have fungible as well as non-fungible classes: hybrid with non-fungible base (fungible classes (whole, transferable, expirable, burnable)). This example may be used to represent a theatre ticket, for instance.

At 512 the server system receives a virtual-ledger architecture selection identifying a provider-defined architecture of the virtual ledger. Example provider-defined architectures include the Ethereum architecture, the R3 Gorda architecture, the Hyperledger Fabric architecture, and the InterLedger architecture. Other blockchain and non-blockchain virtual-ledger architectures are also envisaged.

In the methods herein, the manner by which the client provides the token-behavior and virtual-ledger architecture selections (among other input data) is not particularly limited. In some examples, the selections may be entered on a user interface (UI) of a network application or web app component of token-composability module 312. In some examples, the UI may offer a menu of options customized to the client's commercial needs or other objectives. In some examples, the UI may present a command line interface that enables the client to enter the token-behavior and virtual-ledger architecture selections as text expressions (vide infra).

Returning briefly to FIG. 4A, client UI 402 includes a token-behavior input area 404 having a plurality of check boxes which refer to component behaviors that may be included in a token-class definition. The client may select one or more of the component behaviors by checking the corresponding box or boxes. The token-behavior entry area also includes a radio button that the client may select in order to cause check boxes corresponding to various behavior groups (vide supra) to appear also on the client UI as selectable options. In some examples, as described above, a complex token behavior may be expressible as a subclass, within which one or more component behavior and/or nested subclasses are defined. Accordingly, the token-behavior entry area also includes a button to trigger insertion of a new subclass in the token class being formulated. Alternatively, or in addition to using the graphical features noted above, a sophisticated client may enter a text expression describing a combination of token behaviors directly into text-expression dialog 406 of client UI 402. This feature is described below, in the context of the method of FIG. 7. Client UI 402 also includes a virtual-ledger architecture identification area 412, which includes a plurality of radio buttons that the client may use to identify one of several supported virtual-ledger architectures. It will be understood that the UIs illustrated herein are provided by way of example, and that other UI modalities are also envisaged.

Continuing now in FIG. 5, at 520 the server system constructs a template for the token class to be added to the virtual ledger. The template is constructed based on the behaviors determined by the token-behavior selection and according to the provider-defined architecture identified in the virtual-ledger architecture selection. The template is constructed such that each new token of the token class exhibits the indicated set of behaviors. In some examples, a template so constructed may be reusable for repeated addition of a token class to one or more virtual ledgers.

In some examples, a template may be constructed modularly from code portions or 'snippets' that are compatible with the provider-defined architecture of the virtual ledger. The server system may be configured to combine the snippets and any other required components using syntax and other protocols required by the architecture. Fro the point-of-view of the virtual ledger, the result would be the same whether the token class is created using the approach herein or authored manually by an expert client.

To enable modular construction of a template based on code snippets, the server system may include a library of verified code snippets defining the component token behaviors from which the set of behaviors determined by the token-behavior selection are constructed. Such snippets may be written in a language supported by the virtual-ledger architecture e.g., Solidity language for Ethereum architecture, ChainCode, Java, or Damil languages for other blockchain architectures. Accordingly, 'mintable' behavior may be associated with a Solidity snippet for deployment on an Ethereum blockchain, and with a snippet composed in another language for each of the other architectures. The various snippets may be combined using the class-construction framework of token-composability module 312, in some examples.

At 528 the server system creates a token-deployment package based on the template and on the provider-defined architecture of the virtual ledger. At 530 the server system constructs an API configured to expose one or more behaviors and/or control functions of each new token of the token class registered on the virtual ledger. The API may be architecture-agnostic and may provide, accordingly, a standard programmatic interface for interacting with deployed tokens on any supported virtual ledger.

Depending on the type of token class constructed and on the different behaviors supported, the API may allow a client to fully manipulate the deployed token instances. As a nonlimiting example, the API may provide a standard interface to allow an asset owner to transfer one or more token assets to another party, using software provided by the client. In other words, the API is one tool that the client may use to develop a front-end for translating owner intentions into actions supported by the registered token class. As noted above, each API may be architecture-agnostic, in the sense that architecture-based specificalities are hidden from the application software calling the API functions. Accordingly, the API may provide a uniform experience to the client regardless of the blockchain architecture in use. In effect, neither the client nor the owners ultimately exchanging the asset need to know whether the virtual ledger resides on an Ethereum blockchain or a blockchain of some other architecture. Rather, the very same command (e.g., 'transfer asset') may be translated into desired actions in formats compatible with virtual ledgers of different architectures.

At 532 the server system constructs an SDK configured to facilitate access to one or more behaviors and/or control functions of each new token of the token class on the virtual ledger. At 534 the server system provides client access to one or more of the token-deployment package, the API, and the SDK. In some examples, the server system may provide network access to these components. In some examples, the components are made available to the client for download onto a client computer device.

At 536 the server system receives a token-class deployment instruction from a client computer device. Pursuant to receiving the token-class deployment instruction, the server system at 538 adds the token class as specified by the template to the virtual ledger. In implementations where the template is an extensible template that supports assignment of client metadata to one or more variable properties further illustrated in the method of FIG. 6), the token class, at 538, may be added with such metadata assigned to the one or more variable properties. In examples in which the server system has provided a token-deployment package, the token class may be added to the virtual ledger by execution of the token-deployment package on the network hosting the virtual ledger. In this example, the server system provides network access to the constructed template via the client computer device that issues the deployment instruction. In other examples, the server system may provide direct access to a constructed template e.g., by offering the template for download onto a client computer device.

Generally speaking, the token-class deployment instruction received at 536 may be one of a plurality of client instructions received by the server system. In some implementations, certain non-standard and/or non-generic; policies or protocols may govern the exchange of instructions and other messages with a virtual ledger or supporting network. Such policies or protocols may derive from the provider-defined architecture of the virtual ledger and may differ from one architecture to the next. Instead of requiring the client to be familiar with the policies and protocols of every virtual-ledger architecture supported, the server system may be configured to receive instructions and other messages from a client computer device in an architecture-agnostic (i.e., standard or generic) format. Then, the server system may reformulate each of the client instructions received according to the policies and protocols of the virtual ledger as determined by the provider-defined architecture of the virtual-ledger. The server system may subsequently pass each of the reformulated instructions to the network hosting the virtual ledger. Likewise, the server system may receive, in a non-standard or non-generic form, a plurality of messages from the network hosting the virtual ledger. The server system may reformulate the messages received into an architecture-agnostic format, and provide client access to each of the reformulated messages. In this manner, the server system enables the client to submit instructions to any supported virtual ledger, and to exchange messages with any supported virtual ledger, even without knowing the architecture-specific policies and protocols of the virtual ledger. This approach is further illustrated at 540, ff, in method 500.

At 540 the server system receives a token-management request relating to at least one new token instantiated from a token class registered on a virtual ledger. At 542 the server system reformulates the token-management request according to the provider-defined architecture, including relevant policies and protocols. At 544 the server system submits the reformulated token-management request to the network hosting the virtual ledger. At 546 the server system receives a token-management response. At 548 the server system reformulates the token-management response into an architecture-agnostic format based, again, on the policies and protocols of the virtual ledger as determined by the virtual-ledger architecture. At 550 the server system provides client access to the reformulated token-management response. Returning briefly to FIG. 4A, client UI 402 includes a request dialog 414 that the client may use to enter an architecture-agnostic request to a deployed virtual ledger. The client UI also includes a response dialog 416 that the client may use to view a response from the deployed virtual ledger, which is reformulated in architecture-agnostic format.

Figure 6:
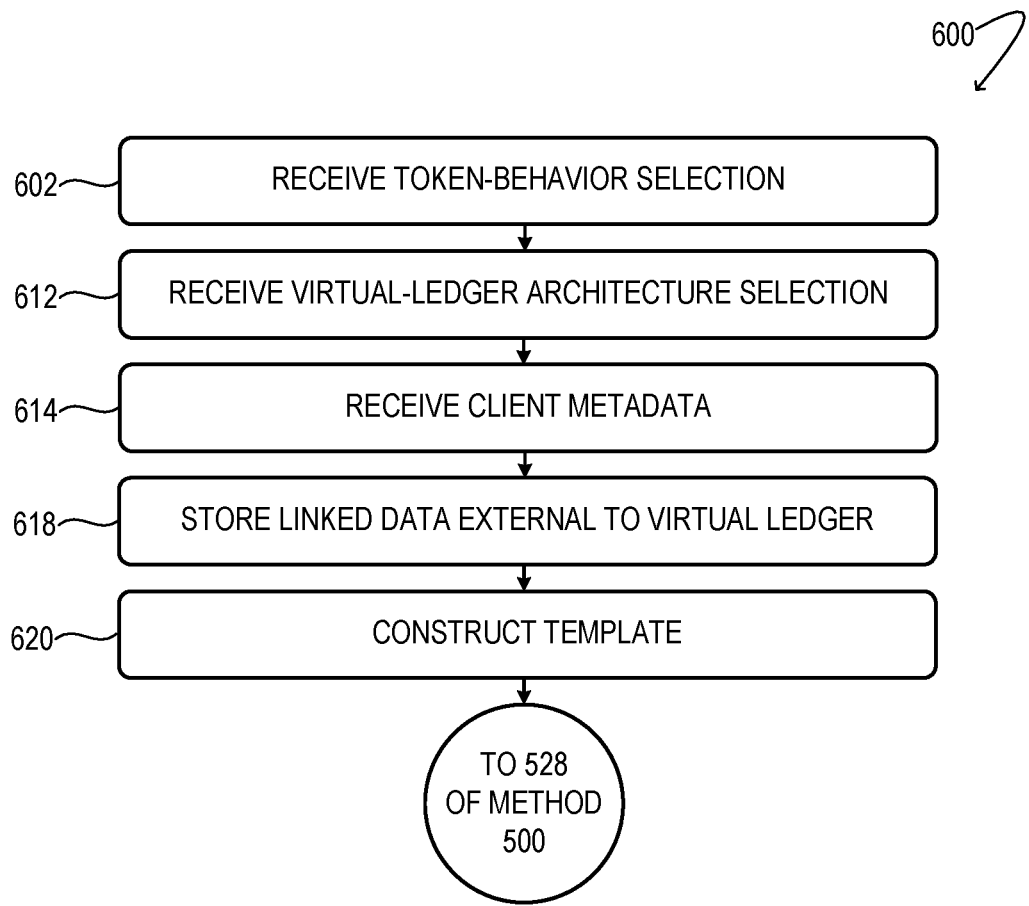

FIG. 6 shows aspects of another example computer-implemented method 600 to enable a real-world asset to be represented and tracked as a digital token on a virtual ledger. Method 600 is particularly directed to customizing otherwise predefined token classes based on metadata provided by a client. In some examples, this method may be implemented on a server system, such as server system 310 of FIG. 3. It will be understood, however, that not all implementations of the method require the detailed server architecture of server system 310 and may be implemented on other types of computer systems. It will be understood also that any process step of this or a subsequent method that has a reference number coordinate to a process step of a previous method (612 is coordinate to 512, for example) may inherit any feature of the previous method step. Nevertheless, such inheritance is not strictly necessary, as coordinately numbered process steps may differ in some examples.

At 602 of method 600, the server system receives a token-behavior selection that determines the set of behaviors required of each new token of a token class. In some examples, the indicated set of behaviors may be one of a plurality of predefined sets of behaviors. In other words, certain sets of behaviors may be preselected for common applicability to many asset types. At 612 the server system receives a virtual-ledger architecture selection identifying a provider-defined architecture of the virtual ledger.

At 614 the server system receives client metadata for assignment to a variable property of each new token of the token class. In some examples, the metadata can be added to the token class without fundamentally changing the behavior of the tokens derived from that class. Non-limiting examples of such metadata include a name, serial number, reference property, SKU, or generic tag. By incorporating such metadata, the same template—e.g., for a fungible token with SupplyControl—can be modified by different clients to build out loyalty programs with different loyalty token names. Each resulting token would then be customized to the client e.g., Alpha Coffee loyalty token, Bravo Airlines loyalty token, and so on. To achieve this effect, among others, the client may specify one or more customization options at the template level by supplying metadata to be included in the corresponding token class. Stated another way, the client is able to supply one or more key-value mappings for each token instance to be created from the token class.

In some examples, the variable property instantiated by the metadata may provide an initial customization applied in common to each new token of the token class. More particularly, the template may, in some examples, be configured such that the variable property of each new token of the token class is fixed upon instantiation of that token on a virtual ledger. In other examples, the template may be configured such that the variable property of each new token of the token class is adjustable after that token is instantiated on the virtual ledger. This variant provides an opportunity for further differentiation among token instances after deployment. In some examples, a dedicated 'CustomMetadata' behavior may be encoded in a token template to indicate that tokens derived from the template have queryable metadata.

Neither the significance nor the format of the variable property is particularly limited. In some examples, the variable property may include text. In some examples, the variable property may include a numeric value. In these and other examples, the variable property may include a link to data which is external to a virtual ledger. In implementations in which the variable property includes a link to data external to the virtual ledger, method 600 may further comprise, at 618, storing the data external to the virtual ledger on a network-accessible data-storage system.

This feature provides an advantage in scenarios in which a significant volume of data is to be associated with one or more token instances. For example, a token that represents an owner's right to consume a digital media asset may be associated with the digital media asset itself e.g., an audio or video file, which may be very large. While such data may be stored directly within a token structure (i.e., redundantly, on every node of a blockchain), doing so would consume resources and degrade the performance of the blockchain. An effective alternative in these scenarios is to store only a link to the data within the token structure, and to store the actual data on a network-accessible service external to the blockchain.

Returning again to FIG. 4A, the client may specify the addition of metadata to a token class being formulated via client 402. By selecting metadata addition button 408, the client may specify that a value is to be assigned to an indicated variable property of the token class. After the button is selected, the client may then enter the desired property value in metadata-value dialog 410.

Continuing now in FIG. 6, at 620 the server system constructs a template for the token class to be added to the virtual ledger. Constructed based on the behaviors defined by the token-behavior selection and according to the provider-defined architecture identified in the virtual-ledger architecture selection, the template includes the client metadata received at 614 of method 600. In some examples, the template may be reusable for repeated addition of the token class to one or more virtual ledgers. Following 620, method 600 may continue at 528 of method 500 of FIG. 5, as all of the methods presented in this disclosure are usable both separately and together.

Figure 7:
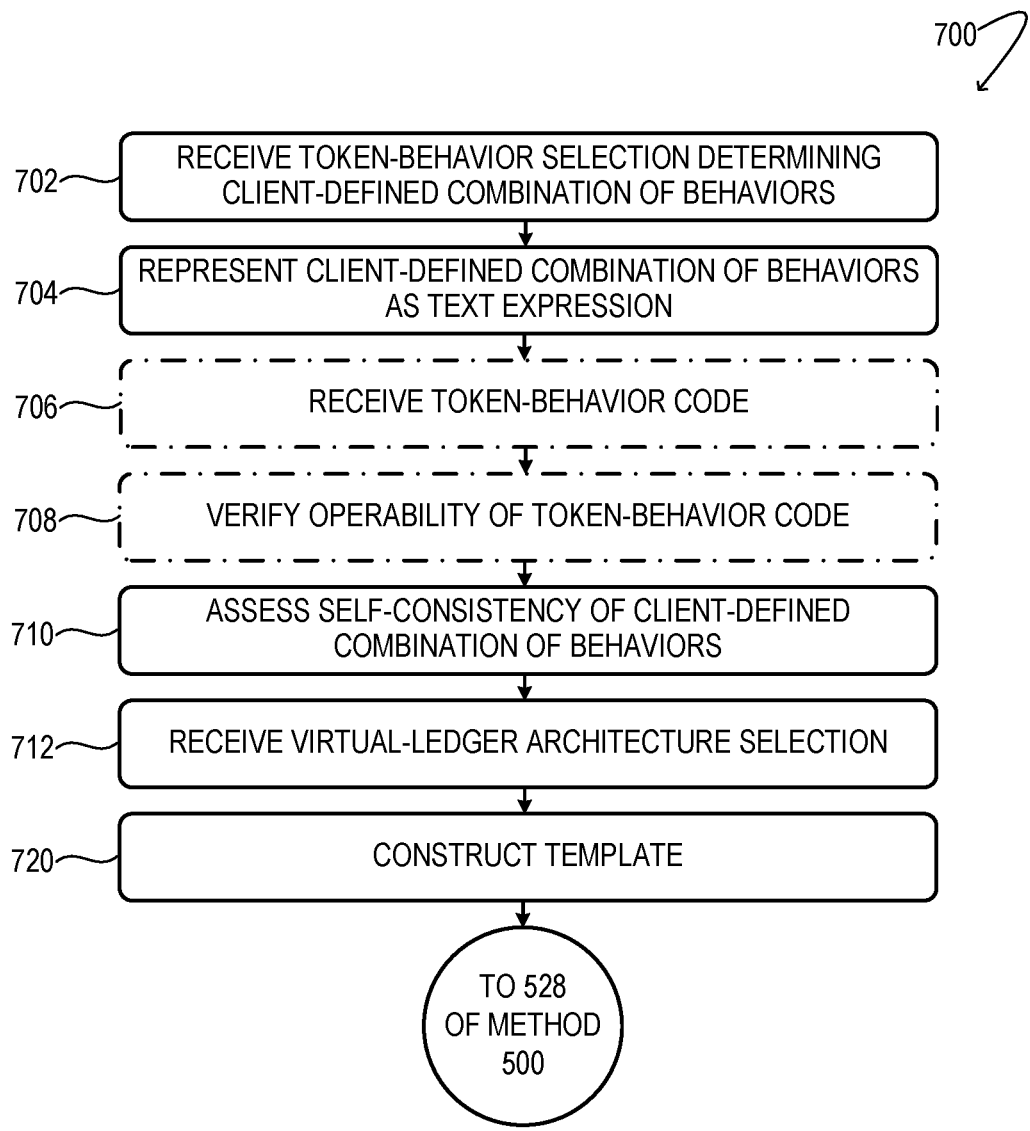

FIG. 7 illustrates aspects of another example computer-implemented method 700 to enable a real-world asset to be represented and tracked as a digital token on a virtual ledger. Method 700 is particularly directed to extending token classes to support client-defined combinations of token behaviors, in some cases including previously undefined token behaviors. In some examples, this method may be implemented on a server system, such as server system 310 of FIG. 3. It will be understood, however, that not all implementations of the method require the detailed server architecture of server system 310 and may be implemented on other types of computer systems.

At 702 of method 700, the server system receives a token-behavior selection that identifies the client-defined combination of behaviors required of each new token of a token class. Such data may be received from a networked client computer device. In some examples, the client-defined combination of behaviors may include at least one pre-defined component behavior. However, the overall combination of behaviors may be particular to the client's needs and specifically constructed to specifically reflect the underlying behaviors of the asset to be tracked.

In one example, the server system, via any suitable application or web app, may present a wizard that asks the client a series of questions. The questions and the sequence in which the questions are presented may be configured to allow a client to define a token class having any configuration supported by a compatible virtual ledger. Alternatively, the server system, again via any suitable application or web app, may present a user interface, such as client 402 of FIG. 4A, which allows a client to select token properties and/or behaviors from a menu. The user interface may be configured to prevent selection of incompatible properties and/or behaviors (as further developed at 710 of this method). As another alternative, the server system may present a command-line interface, also shown in FIG. 4A, that allows the client to enter directly a text expression that represents the client-defined combination of behaviors.

In some implementations, a text expression representing a combination of behaviors may be formulated according to a standard vocabulary and grammar recognized by token-composability module 312. The text expression may symbolize a base-level behavior—e.g., $\tau_F$ for fungible behavior and $\tau_N$ for non-fungible behavior. The text expression may also symbolize hybrid token behavior. For instance, $\tau_N(\tau_F)$ symbolizes a non-fungible base with a fungible class; $\tau_F(\tau_N)$ symbolizes a fungible base with a non-fungible class.

Particular token behaviors may be symbolized by lower-case letters, optionally prepended by a NOT symbol (~). By way of example, t may symbolize transferrable behavior, while ~t may symbolize non-transferrable behavior; d may symbolize subdividable behavior, while ~d may symbolize whole behavior. Furthermore, s may symbolize singleton behavior, m may symbolize mintable behavior, r may symbolize RoleSupport behavior, b may symbolize burnable behavior, e may symbolize expirable behavior, and g may symbolize delegable behavior.

A behavior group may be symbolized by an upper-case letter or unique set of letters with a corresponding behavior formula enclosed in curly braces. For example, SupplyControl behavior may be symbolized SC {m, b, r}. This formulation is useful for representing more complex combinations of token behaviors of common assets. The behaviors characterizing currency may be symbolized $\tau_F$ {d, SC}. The behaviors characterizing a vote may be symbolized $\tau_N$ {~t, S}, where S refers to suspendable behavior. In this approach, behaviors characterizing a theatre ticket may be symbolized $\tau_N(\tau_F)$ {e, t}; behaviors characterizing a commodity may be symbolized $\tau_F$ {~d, g, SC}.

As yet another alternative, the server system may support an API that allows first and/or third party front-ends to interact with token-composability module 312 (referring again to FIG. 3), so that any desired front-facing user experience can be designed to take advantage of the back-end framework of the token-composability module. Various different front-end approaches can be designed to translate client selections into corresponding text expressions. Like the wizard and UI alternatives, this approach allows the client to take advantage of the token-composability grammar (vide infra) without having to learn the grammar.

Using any of the approaches described herein, the client can modify an existing template by adding and/or removing selected behaviors. The resulting modified template may be saved in the server system for later reuse. If the client de res to use the newly composed template again, he or she may select the template from a history list. This feature enables the client to quickly move beyond predefined templates and create extended templates to match commercial, organizational, social, and/or governmental objectives.

At 704 the server system represents the client-defined combination of behaviors as a text expression according to a token-behavior grammar. Earlier in the description of method 700 it was noted that the client-defined combination of token behaviors could be initially specified as a text expression, as one of several alternatives that also include the use of a wizard, UI or API. In implementations in which the client-defined combination is not initially specified as a text expression, the client-defined combination may be reformulated as a text expression, in order to take advantage of the powerful features of the token-composability grammar. Such features include the ability to verify the self-consistency of client-defined combinations of behaviors (vide infra).

In these and other examples, a client-defined combination of behaviors may include at least one previously undefined component behavior. In implementations in which at least one previously undefined component behavior is included in a client-defined combination, method 700 may further comprise, at 706, the optional step of receiving token-behavior code programmatically defining the at least one previously undefined component behavior. The method may further comprise, at 708, the optional step of verifying the operability of the token-behavior code on the indicated virtual ledger. In the scenario in which the token-behavior code executes without error, the token-behavior code may be stored in token-composability module 312 as a snippet and incorporated into the token class defined by the template. In the scenario in which the token-behavior executes erroneously or does not execute, execution of method 700 may be suspended.

At 710, irrespective of whether the client-defined combination includes a previously undefined component behavior, the server system may assess the self-consistency of the client-defined combination of behaviors. Verification may take the form of a hard coded check including a series of tests to make sure that mutually incompatible properties and/or behaviors are not specified concurrently for the same token class. In other cases, configurable rules may be passed to the verifier. As a simplistic example, mintable may not be compatible with burnable. Before instantiating a token class for a particular virtual ledger, the verifier may determine that if the expression combines mintable and burnable, then the token class will not be generated. Although in some examples and scenarios, a given virtual-ledger architecture may not support a given combination of behaviors, such as mintable and burnable, a different virtual-ledger architecture may allow these same behaviors to combined. Accordingly, in a scenario in which ten different provider-defined architectures are supported and each architecture can support different client-defined combinations of behaviors, the requirements may be set individually for each architecture.

In some examples, verification of the self-consistency of client-defined combinations of behaviors may include application of certain grammar rules to combinations formulated as text expressions. Grammar rules may be scoped to support particular limitations. For example, the following behaviors are incompatible or orthogonal: (whole or singleton) and subdividable; (transferable or TransferFrom or delegable) and non-transferable. Furthermore, burnable should be automatically turned off if there is supply left, and only if a token has 'expired' can it be re-activated through the 'renew' behavior. In the scenario in which a client-defined combination of token behaviors is self-consistent, that combination may be added to the token class defined by the template. In the scenario in which a client-defined combination of token behaviors is not self-consistent, execution of method 700 may be suspended.

At 712 the server system receives a virtual-ledger architecture selection identifying a provider-defined architecture of the virtual ledger. At 720 the server system constructs a template for the token class to be added to the virtual ledger. The template is constructed based on the client-defined combination of behaviors determined by the token-behavior selection and according to the provider-defined architecture identified in the virtual-ledger architecture selection. The template is constructed such that each new token of the token class exhibits the indicated client-defined combination of behaviors. In some examples the template constructed at 720 may be a derived template that inherits one or more properties and/or behaviors of a preexisting template; here, one or more properties and/or behaviors defined by the preexisting template may be overridden by the client-defined combination of behaviors as defined by the derived template. In some examples, the template may be reusable for repeated addition of the token class to one or more virtual ledgers. Following 720, method 700 may continue at 528 of method 500 of FIG. 5, as all of the methods presented in this disclosure are usable both separately and together.

Figure 8:
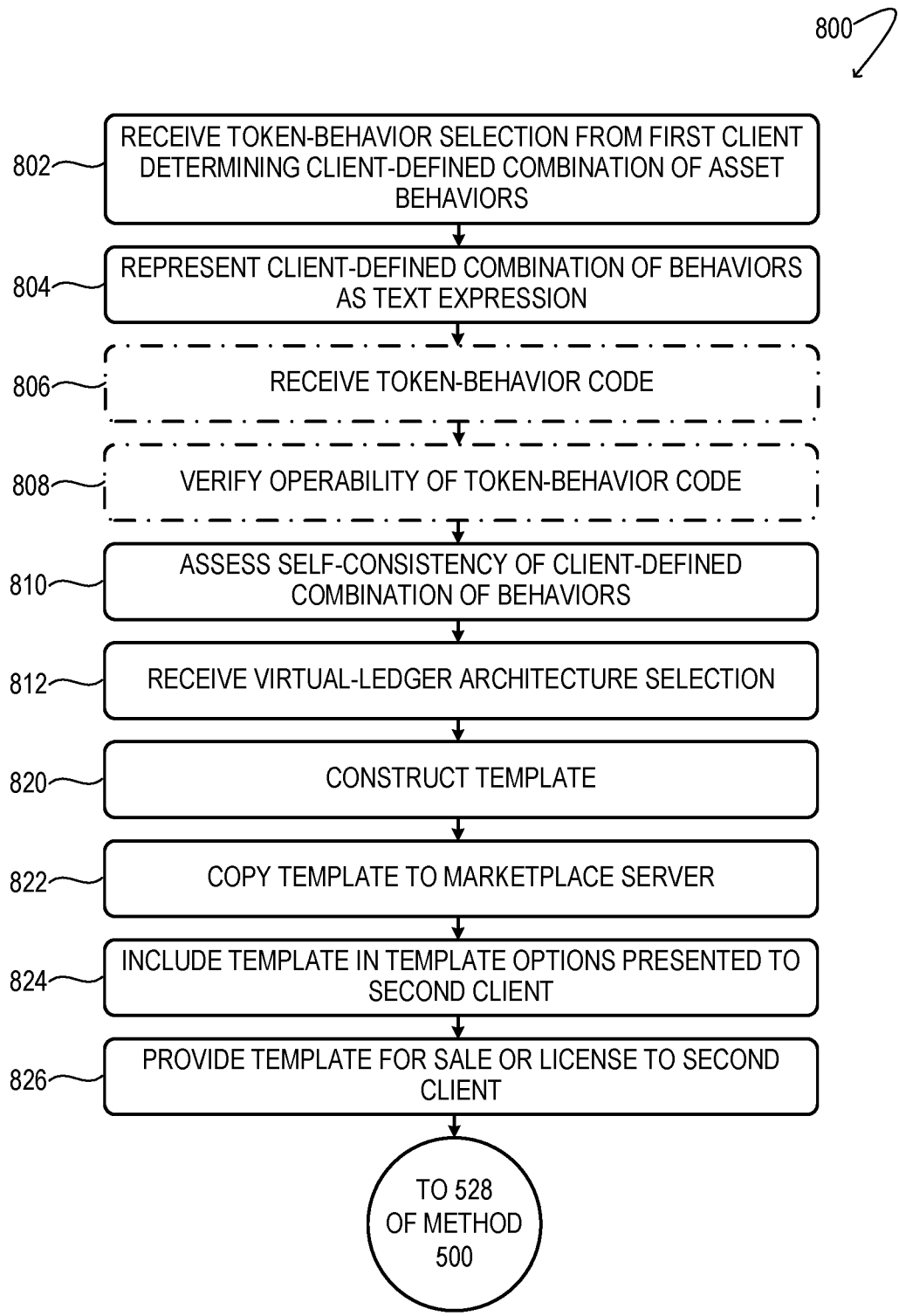

FIG. 8 illustrates aspects of another example computer-implemented method 800 to enable a real-world asset to be represented and tracked as a digital token on a virtual ledger. Method 800 is particularly directed to sharing and/or monetizing token classes supporting client-defined combinations of behaviors, such token classes being valuable not only to the authoring client but to other clients with similar asset-tracking needs. In some examples, this method may be implemented on a server system, such as server system 310 of FIG. 3. It will be understood, however, that not all implementations of the method require the detailed server architecture of server system 310 and may be implemented on other types of computer systems.

At 802 the server system receives a token-behavior selection from a first client. The token-behavior selection determines the client-defined combination of behaviors required of each new token of a token class to be registered on the virtual ledger. In some examples, the client-defined combination of behaviors may include at least one predefined component behavior. However, the overall combination of behaviors may be particular to the first client's needs and specifically constructed to specifically reflect the underlying behaviors of the asset to be tracked. The specified combination of behaviors may also be applicable to the needs of other clients e.g., to track different assets.

At 804 the server system represents the client-defined combination of behaviors as a text expression according to a token-behavior grammar. In these and other examples, the client-defined combination of behaviors may include at least one previously undefined component behavior. In implementations in which at least one previously undefined component behavior is included in the client-defined combination, method 800 may further co se, at 806, the optional step of receiving token-behavior code programmatically defining the at least one previously undefined component behavior. The method may further comprise, at 808, the optional step of verifying the operability of the token-behavior code on the specified virtual ledger. At 810, irrespective of whether the client-defined combination includes a previously undefined component behavior, the server system may assess the self-consistency of the client-defined combination of behaviors. At 812 the server system receives a virtual-ledger architecture selection from the first client. The virtual-ledger architecture selection identifies a provider-defined architecture of the virtual ledger.

At 820 the server system constructs a template for the token class to be added to the virtual ledger. The template is constructed based on the client-defined combination of behaviors determined by the token-behavior selection and according to the provider-defined architecture identified in the virtual-ledger architecture selection. The template is constructed such that each new token of the token class exhibits the indicated client-defined combination of behaviors. In some examples the template constructed at 820 may be a derived template that inherits one or more properties and/or behaviors of a preexisting template; here, one or more behaviors defined by the preexisting template may be overridden by the client-defined combination of behaviors as defined by the derived template. In some examples, the template may be reusable for repeated addition of the token class to one or more virtual ledgers.

A template constructed based on the specifications of the first client may be offered for sale or license to other interested clients. At 822, of method 800, the server system facilitates this activity. At 822, the template prepared according to the specifications of the first client is copied to a marketplace service module of the server system, which is accessible to other potential clients. The marketplace service may be configured to recognize, predict, or receive as input, an indication of the asset-tracking needs of the potential clients that log into the marketplace service. Via analysis of each potential clients asset-tracking needs, the marketplace service may present to each potential client a customized menu of token-template options. At 824 of method 800, the template prepared according to the specifications of the first client is included in the template options presented to a second client. Presentation of the template properties and/or behaviors to the second client may include a plain-language description of the client-defined combination of token behaviors associated with that template. Returning briefly to FIG. 4B, the plain-language description may appear in template-description window 420 of marketplace UI 418. If, after examination of this template (i.e., of the description of the client-defined combination of behaviors therein) the second client indicates interest in the template, then the template is provided, at 826 of FIG. 8, for sale or license to the second client.

Marketplace access to the template may be provided in this manner to a plurality of client computer devices operated by different clients. This service may include a back end for transferring a purchased or licensed template to buyer in exchange for compensation. In examples in which the template is composed based on a combination of behaviors specified by a first client and intended to be offered for sale or license to other clients, any text expression formulated in token-behavior grammar may be masked in the template. In more particular examples, such text expressions may be encrypted. By virtue of encryption or other forms of masking, the first client may be assured that template does not reveal a reusable text expression to potential competitors, consumers, or licensees. Following 826, method 800 may continue at 528 of method 500 of FIG. 5, as all of the methods presented in this disclosure are usable both separately and together. In transitioning to method 500, it will be understood that e token-class deployment instruction and any token-management instructions are received from a client computer device operated by a second client.

No aspect of the foregoing drawings or description should be construed in a limiting sense, as numerous extensions, variations, and omissions are also envisaged. For instance, each of the methods illustrated in FIGS. 5 through 8 includes a step of receiving a virtual-ledger architecture selection identifying a provider-defined architecture of the virtual ledger. In implementations supporting a single virtual-ledger architecture, however, this step may be omitted. In such implementations, any instruction to create a token template is an inherent selection of the single supported virtual-ledger architecture. It may also be omitted in the hypothetical scenario in which the policies, protocols, and/or programming languages of the various virtual-ledger architectures have become standardized.

Although this disclosure emphasizes blockchain implementations of a virtual ledger, other network-based approaches are also envisaged. In one example, a network-accessible XML document comprising a series of time-stamped, user-authenticated sections may be used to support a virtual ledger for tracking a real-world asset. A cryptographic signature in addition to other encrypted data may be included in an XML file in any suitable encoding (e.g., a Base64 encoding using ASCII characters).

Figure 9:
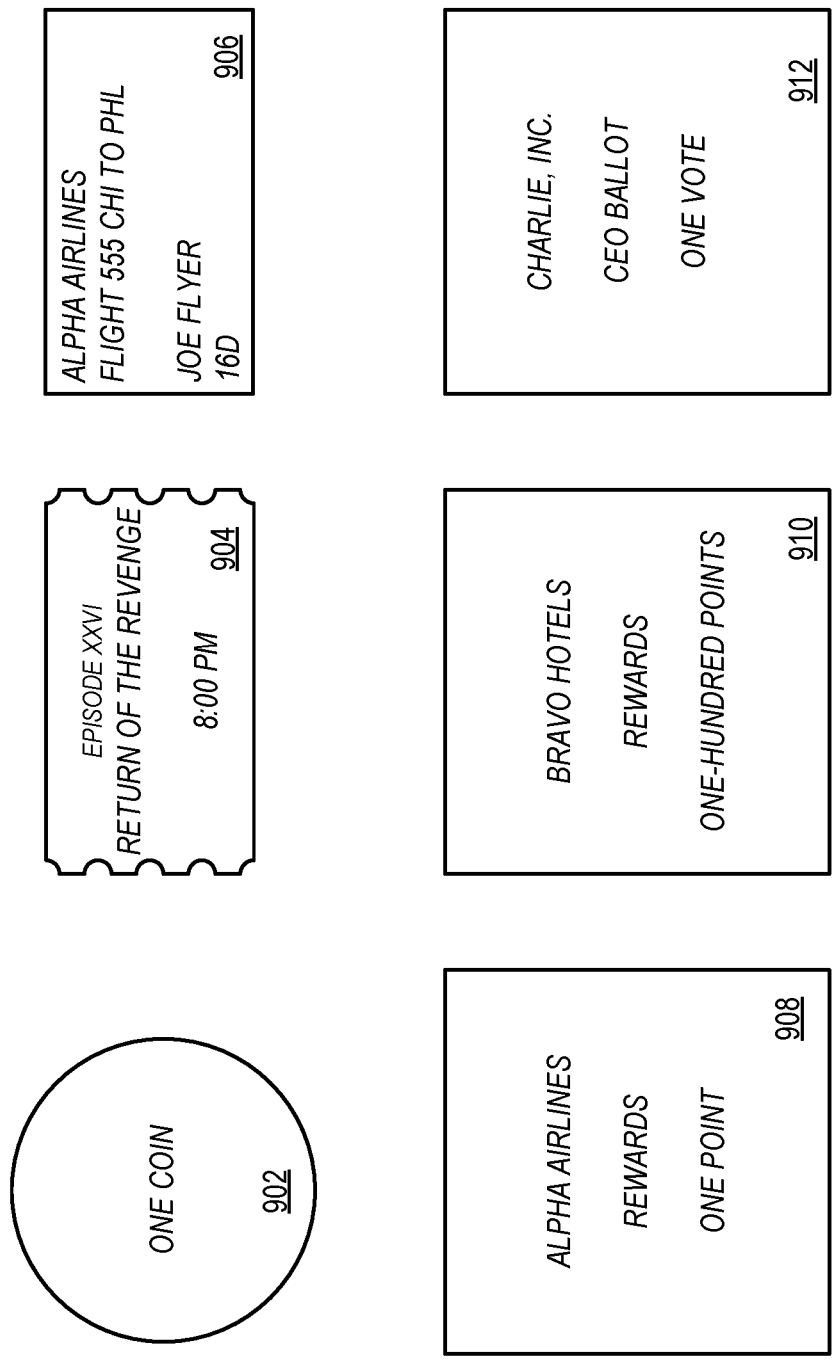
FIG. 9 shows examples of several real-world assets that may be represented as tokens on a virtual ledger.

FIG. 9 shows examples of several real-world assets that may be tracked using the systems and methods disclosed herein. More particularly, the drawing shows a unit 902 of currency, a theatre ticket 904, an airline ticket 906, an airline rewards point 908, a hotel rewards point 910, and a vote 912. As noted above, the unit of currency is fungible. The unit of currency is also freely transferrable from one owner to another. Even though the airline ticket and airline rewards point may be issued by the same client, and, in some examples, tracked on the same virtual ledger, these assets have different behaviors. The airline ticket specifies a particular flight number, passenger identity, flight date, and seat assignment, and is therefore both non-fungible and non-transferrable, whereas the airline rewards point is both fungible and transferrable. The vote may be fungible but non-transferrable, if issued by a government. A vote issued by a corporation may be generally non-transferrable, but 'delegable' to another voter, in some scenarios.

The examples illustrated above should not be construed to limit the application space of the asset-tracking methods disclosed herein, as such methods are applicable to wide range of client objectives. One example relates to a loyalty program suitable for a major hotel chain. The hotel chain may have a robust loyalty program that leverages one or more partner programs. In a scenario in which the hotel chain's loyalty tokens are to be redeemed, the hotel chain's customer, a token owner, may desire to purchase an airline ticket from an airline partner of the hotel chain. The customer, therefore, may log into the hotel chain's loyalty platform to initiate a spend request. On the back end, the hotel chain's business logic converts the hotel chain's loyalty token, defined by token-composability module 312, to the airline's loyalty token and loads the customer's airline loyalty account accordingly. The customer can then purchase an airline ticket with airline loyalty points.

In a scenario in which loyalty tokens are to be exchanged between owners, a token owner may desire to trade one or more of the hotel chain's loyalty tokens for loyalty tokens of a partner of the hotel chain. This customer may then log into the hotel chain's loyalty program to visit a loyalty-token exchange platform, which reveals whether another token owner wishes to trade the specified tokens. If so, a suitably developed front-end system may facilitate the trade.

In a scenario related to the field of trade finance, a brokerage may support a finance platform using blockchain technology, focusing on pre- and post-shipment trade finance solutions. In a scenario related to letters of credit, a client may tokenize an actual financial instrument. Token-composability module 312 may offer a document token with specific properties associated with a letter of credit, such as a document hash with signatures required, etc. Additional application scenarios extend to the field of commodity financing, where two or more platforms need to work closely together to ensure that financing and commodity trades happen in a trusted manner. In a scenario related to encumbering assets, token-composability module 312 may be used to create a token class that makes the act of encumbering an asset a more automated process in the commodity financing use cases. An encumbering token may be created and assigned on the plural networks, to be associated with the financing or commodity to be traded.

The methods and processes described herein may be tied to a computing system of one or more computing devices. In particular, such methods and processes may be implemented as an computer-application program, a network-accessible computing service, an application-programming interface (API), a library, or a combination of the above and/or other compute resources.

Figure 10:
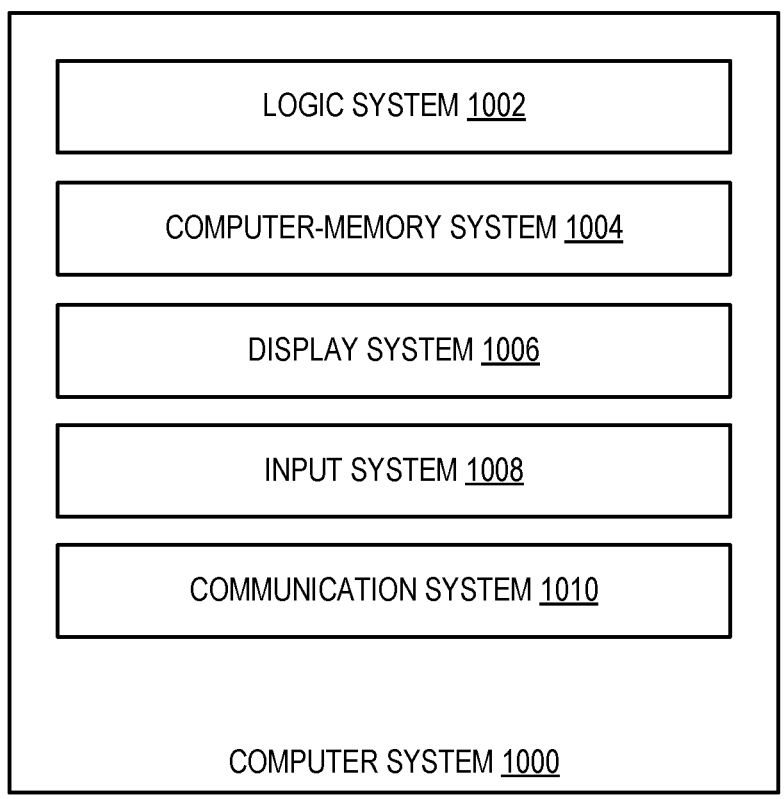
FIG. 10 shows aspects of an example computer system.

FIG. 10 schematically shows a simplified representation of a computing system 1000 configured to provide any to all of the compute functionality described herein. Computing system 1000 may take the form of one or more personal computers, workstations, network-accessible server computers, tablet computers, mobile communication devices (e.g., smart phones), and/or other computing devices.

Computing system 1000 includes a logic subsystem 1002 and a storage subsystem 1004. Computing system 1000 may optionally include a display subsystem 1006 input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more operating systems, applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term 'machine' is used to collectively refer to the combination of hardware, firmware, software, instructions, and/or any other components cooperating to provide computer functionality. In other words, 'machines' are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques tokenization, stemming, constituency and/or dependency parsing, and/or intent recognition, segmentable models, and/or super-segmentable models (e.g., hidden dynamic models)).

When display subsystem 1006 may be used to present a visual representation of data held by storage subsystem 1004 This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, or touch screen.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal, local- and/or wide-area networks.

This disclosure is presented by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

One aspect of this disclosure is directed to a computer-implemented method comprising: receiving a token-behavior selection corresponding to a real-world asset to be tracked on a blockchain ledger; receiving a blockchain-architecture selection identifying a provider-defined architecture of the blockchain ledger; constructing a template for registration of a token class on the blockchain ledger according to the provider-defined architecture of the blockchain ledger, wherein each new token instantiated from the token class exhibits a set of behaviors determined by the token-behavior selection, and wherein the template is reusable for repeated addition of the token class to one or more blockchain ledgers; and adding the token class to the blockchain ledger.

In some implementations, the method further comprises creating a token-deployment package based on the template and on the provider-defined architecture of the blockchain ledger, wherein adding the token class to the blockchain ledger includes executing the token-deployment package on a network hosting the blockchain ledger. In some implementations, the set of behaviors is one of a plurality of predefined sets of behaviors. In some implementations, the set of behaviors includes token-fungible behavior and inventory-control behavior. In some implementations, the set of behaviors includes token-fungible behavior and token-expiration behavior. In some implementations, the method further comprises receiving a token-class deployment instruction, wherein the token class is added to the blockchain ledger pursuant to receiving the token-class deployment instruction. In some implementations, the token-class deployment instruction is one of a plurality of instructions received, the method further comprising: reformulating each of the instructions received according to the provider-defined architecture of the blockchain ledger; passing each of the reformulated instructions to a network hosting the blockchain ledger; receiving a plurality of responses from the network hosting the blockchain ledger; reformulating each of the responses received into an architecture-agnostic format; and providing client access to each of the reformulated responses.

Another aspect of this disclosure is directed to a computer system comprising a logic system and, operatively coupled to the logic system, a computer-memory system holding instructions that, when executed by the logic system, cause the computer system to: receive a token-behavior selection corresponding to a real-world asset to be tracked on a virtual ledger; receive a virtual-ledger architecture selection identifying a provider-defined architecture of the virtual ledger; construct a template for registration of a token class on the virtual ledger according to the provider-defined architecture of the virtual ledger, wherein each new token instantiated from the token class exhibits a set of behaviors determined by the token-behavior selection; and provide access to the template to a client computer device.

In some implementations, the virtual ledger includes a blockchain ledger. In some implementations, the set of behaviors is one of a plurality of predefined sets of behaviors. In some implementations, the set of behaviors includes token-fungible behavior and inventory-control behavior. In some implementations, the set of behaviors includes token-fungible behavior and token-expiration behavior.

Another aspect of this disclosure is directed to a computer-implemented method comprising: receiving a token-behavior selection corresponding to a real-world asset to be tracked on a virtual ledger; receiving a virtual-ledger architecture selection identifying a provider-defined architecture of the virtual ledger; constructing a template for registration of a token class on the virtual ledger according to the provider-defined architecture of the virtual ledger, wherein each new token instantiated from the token class exhibits a set of behaviors determined by the token-behavior selection; adding the token class to the virtual ledger; receiving a token-management request relating to at least one token instantiated from the token class; reformulating the token-management request according to the provider-defined architecture of the virtual ledger; and submitting the reformulated token-management request to a network hosting the virtual ledger.

In some implementations, the set of behaviors is one of a plurality of predefined sets of behaviors. In some implementations, the method further comprises receiving a token-class deployment instruction, wherein the token class is added to the virtual ledger pursuant to receiving the token-class deployment instruction. In some implementations, the token-class deployment instruction is one of a plurality of instructions received, the method further comprising: reformulating each of the instructions received according to the provider-defined architecture of the virtual ledger; passing each of the reformulated instructions to a network hosting the virtual ledger; receiving a plurality of responses from the network hosting e virtual ledger; reformulating each of the responses received into an architecture-agnostic format; and providing client access to each of the reformulated responses. In some implementations, the method further comprises creating a token-deployment package based on the template and on the provider-defined architecture of the virtual ledger, wherein adding the token class to the virtual ledger includes executing the token-deployment package on the network hosting the virtual ledger. In some implementations, the method further comprises: providing client access to an application-programming interface (API) configured to expose one or more behaviors and/or control functions of each new token of the token class on the virtual ledger. In some implementations, the method further comprises constructing the API. In some implementations, the method further comprises providing client access to a software-development kit (SDK) configured to facilitate access to one or more behaviors and/or control functions of each new token of the token class on the virtual ledger.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method comprising:
   receiving a token-behavior selection corresponding to a real-world asset to be tracked on a blockchain ledger;
   receiving a blockchain-architecture selection identifying a provider-defined architecture of the blockchain ledger;
   constructing a template for registration of a token class on the blockchain ledger according to the provider-defined architecture of the blockchain ledger, wherein each new token instantiated from the token class exhibits a set of behaviors determined by the token-behavior selection, and wherein the template is reusable for repeated addition of the token class to one or more blockchain ledgers; and
   adding the token class to the blockchain ledger.

2. The method of claim 1 further comprising creating a token-deployment package based on the template and on the provider-defined architecture of the blockchain ledger, wherein adding the token class to the blockchain ledger includes executing the token-deployment package on a network hosting the blockchain ledger.

3. The method of claim 1 wherein the set of behaviors is one of a plurality of predefined sets of behaviors.

4. The method of claim 1 wherein the set of behaviors includes token-fungible behavior and inventory-control behavior.

5. The method of claim 1 wherein the set of behaviors includes token-fungible behavior and token-expiration behavior.

6. The method of claim 1 further comprising receiving a token-class deployment instruction, wherein the token class is added to the blockchain ledger pursuant to receiving the token-class deployment instruction.

7. The method of claim 6 wherein the token-class deployment instruction is one of a plurality of instructions received, the method further comprising:
   reformulating each of the instructions received according to the provider-defined architecture of the blockchain ledger;
   passing each of the reformulated instructions to a network hosting the blockchain ledger;
   receiving a plurality of responses from the network hosting the blockchain ledger;
   reformulating each of the responses received into an architecture-agnostic format; and
   providing client access to each of the reformulated responses.

8. A computer system comprising:
   a logic system; and
   operatively coupled to the logic system, a computer-memory system holding instructions that, when executed by the logic system, cause the computer system to:
      receive a token-behavior selection corresponding to a real-world asset to be tracked on a virtual ledger;
      receive a virtual-ledger architecture selection identifying a provider-defined architecture of the virtual ledger;
      construct a template for registration of a token class on the virtual ledger according to the provider-defined architecture of the virtual ledger, wherein each new token instantiated from the token class exhibits a set of behaviors determined by the token-behavior selection; and
      provide access to the template to a client computer device.

9. The computer system of claim 8 wherein the virtual ledger includes a blockchain ledger.

10. The computer system of claim 8 wherein the set of behaviors is one of a plurality of predefined sets of behaviors.

11. The computer system of claim 8 wherein the set of behaviors includes token-fungible behavior and inventory-control behavior.

12. The computer system of claim 8 wherein the set of behaviors includes token-fungible behavior and token-expiration behavior.

13. A computer-implemented method comprising:
   receiving a token-behavior selection corresponding to a real-world asset to be tracked on a virtual ledger;
   receiving a virtual-ledger architecture selection identifying a provider-defined architecture of the virtual ledger;
   constructing a template for registration of a token class on the virtual ledger according to the provider-defined architecture of the virtual ledger, wherein each new token instantiated from the token class exhibits a set of behaviors determined by the token-behavior selection;
   adding the token class to the virtual ledger;
   receiving a token-management request relating to at least one token instantiated from the token class;
   reformulating the token-management request according to the provider-defined architecture of the virtual ledger; and
   submitting the reformulated token-management request to a network hosting the virtual ledger.

14. The method of claim 13 wherein the set of behaviors is one of a plurality of predefined sets of behaviors.

15. The method of claim 13 further comprising receiving a token-class deployment instruction, wherein the token class is added to the virtual ledger pursuant to receiving the token-class deployment instruction.

16. The method of claim 15 wherein the token-class deployment instruction is one of a plurality of instructions received, the method further comprising:
   reformulating each of the instructions received according to the provider-defined architecture of the virtual ledger;
   passing each of the reformulated instructions to a network hosting the virtual ledger;
   receiving a plurality of responses from the network hosting the virtual ledger;
   reformulating each of the responses received into an architecture-agnostic format; and
   providing client access to each of the reformulated responses.

17. The method of claim 13 further comprising creating a token-deployment package based on the template and on the provider-defined architecture of the virtual ledger, wherein adding the token class to the virtual ledger includes executing the token-deployment package on the network hosting the virtual ledger.

18. The method of claim 13 further comprising: providing client access to an application-programming interface (API)

configured to expose one or more behaviors and/or control functions of each new token of the token class on the virtual ledger.

19. The method of claim 18 further comprising constructing the API.

20. The method of claim 13 further comprising providing client access to a software-development kit (SDK) configured to facilitate access to one or more behaviors and/or control functions of each new token of the token class on the virtual ledger.

* * * * *